United States Patent
Bhalerao et al.

(10) Patent No.: US 10,444,938 B1
(45) Date of Patent: Oct. 15, 2019

(54) SYSTEMS AND METHODS FOR CUSTOMIZING USER ICONS

(71) Applicant: Symantec Corporation, Mountain View, CA (US)

(72) Inventors: Kavita Bhalerao, Pashan (IN); Sinoj Mullangath, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 388 days.

(21) Appl. No.: 14/190,430

(22) Filed: Feb. 26, 2014

(51) Int. Cl.
 *G06F 3/0482* (2013.01)
 *G06F 3/0481* (2013.01)
 *G06F 3/0484* (2013.01)

(52) U.S. Cl.
 CPC ........ *G06F 3/0482* (2013.01); *G06F 3/04817* (2013.01); *G06F 3/04845* (2013.01)

(58) Field of Classification Search
 CPC ...................................................... G06F 3/048
 USPC ........................................................ 715/765
 See application file for complete search history.

(56) References Cited

U.S. PATENT DOCUMENTS

| | | | | |
|---|---|---|---|---|
| 7,447,996 B1* | 11/2008 | Cox | ..................... | G06Q 10/107 709/203 |
| 8,077,931 B1* | 12/2011 | Chatman | ............... | G06T 7/0012 382/118 |
| 2009/0079813 A1* | 3/2009 | Hildreth | ................. | H04N 7/147 348/14.03 |
| 2009/0251484 A1* | 10/2009 | Zhao | ................. | H04M 1/72544 345/591 |
| 2011/0025689 A1* | 2/2011 | Perez | .................... | A63F 13/213 345/420 |
| 2011/0248992 A1* | 10/2011 | van Os | .................... | G06T 11/60 345/419 |
| 2011/0292051 A1* | 12/2011 | Nelson | ............... | G06K 9/00281 345/467 |
| 2012/0309520 A1* | 12/2012 | Evertt | .................... | G06T 19/20 463/31 |
| 2013/0015946 A1* | 1/2013 | Lau | ......................... | G07C 9/00 340/5.2 |
| 2013/0201105 A1* | 8/2013 | Ptucha | ................... | G06F 3/017 345/158 |
| 2014/0160149 A1* | 6/2014 | Blackstock | ........... | G06N 3/006 345/619 |

* cited by examiner

*Primary Examiner* — Tadesse Hailu
*Assistant Examiner* — Darrin Hope
(74) *Attorney, Agent, or Firm* — FisherBroyles, LLP

(57) ABSTRACT

A computer-implemented method for customizing user icons may include (1) detecting that a user has accessed an application, (2) automatically capturing an image of the user in response to detecting that the user has accessed the application, (3) abstracting the image of the user to produce a customized representation of the user, and (4) overlaying the abstracted image of the user onto an icon within the application. Various other methods, systems, and computer-readable media are also disclosed.

19 Claims, 9 Drawing Sheets

Image 212

SYSTEMS AND METHODS FOR CUSTOMIZING USER ICONS

BACKGROUND

Many software applications include user profiles that allow users to customize settings and store personalized information within the application. While some software applications may allow users to personalize their profiles, many applications only represent the user with a standard, generic icon or no icon at all. Furthermore, even if a software application allows profile customization, manual profile customization may be may be tedious and time consuming. As such, the current application discloses more efficient and effective systems and methods for personalizing user profiles with customized user icons.

SUMMARY

As will be described in greater detail below, the instant disclosure generally relates to systems and methods for customizing user icons by automatically capturing and overlaying an image of a user onto an icon after detecting that the user has accessed the application.

In one example, a computer-implemented method for customizing user icons may include (1) detecting that a user has accessed an application, (2) automatically capturing an image of the user in response to detecting that the user has accessed the application, (3) abstracting the image of the user to produce a customized representation of the user, and (4) overlaying the abstracted image of the user onto an icon within the application.

In some embodiments, overlaying the abstracted image of the user onto the icon may include overlaying the abstracted image of the user onto an existing icon within the application. In other embodiments, overlaying the abstracted image of the user onto the icon may include first determining that the application does not include an existing icon. In such embodiments, in response to determining that the application does not include an existing icon, the method may include creating an icon within the application and overlaying the abstracted image of the user onto the created icon.

In some examples, automatically capturing the image of the user may include automatically triggering a camera on a computing system hosting the application to capture the image of the user. In other examples, automatically capturing the image of the use may include automatically prompting the user to direct the camera to capture the image of the user.

In some embodiments, abstracting the image of the user may include identifying physical characteristics of the user. The physical characteristics may include a gender of the user, a race of the user, an age range of the user, facial feature structures of the user, a hairstyle of the user, a facial hair pattern of the user, and/or accessories worn by the user. In such embodiments, after identifying the physical characteristics of the user, the method may include mapping each physical characteristic to an abstracted representation of the physical characteristic from within a predetermined set of abstracted representations. The method may then include compiling the abstracted representations into the abstracted image of the user.

In some examples, the method may further include detecting that an additional user has accessed the application. In response to detecting that the additional user has accessed the application, the method may include automatically capturing and abstracting an image of the additional user and then overlaying the abstracted image of the additional user onto an additional icon. In these examples, detecting that the additional user has accessed the application may include determining that the additional user has logged onto the application with different login credentials than the original user. Detecting that the additional user has accessed the application may also include determining that the facial characteristics of the additional user do not match the facial characteristics of the original user by automatically capturing and analyzing the image of the additional user.

In some embodiments, the method may further include determining that the user has entered at least one item of information that identifies a physical characteristic of the user into a user profile associated with the application. The method may then include mapping the information that identifies the physical characteristic of the user to an abstracted representation of the physical characteristic from within a predetermined set of abstracted representations. Next, the method may include incorporating the abstracted representation into the abstracted image of the user.

In one embodiment, a system for implementing the above-described method may include (1) a detection module that detects that a user has accessed an application, (2) an image module that automatically captures an image of the user in response to detecting that the user has accessed the application, (3) an abstraction module that abstracts the image of the user to produce a customized representation of the user, and (4) an icon module that overlays the abstracted image of the user onto an icon within the application.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect that a user has accessed an application, (2) automatically capture an image of the user in response to detecting that the user has accessed the application, (3) abstract the image of the user to produce a customized representation of the user, and (4) overlay the abstracted image of the user onto an icon within the application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
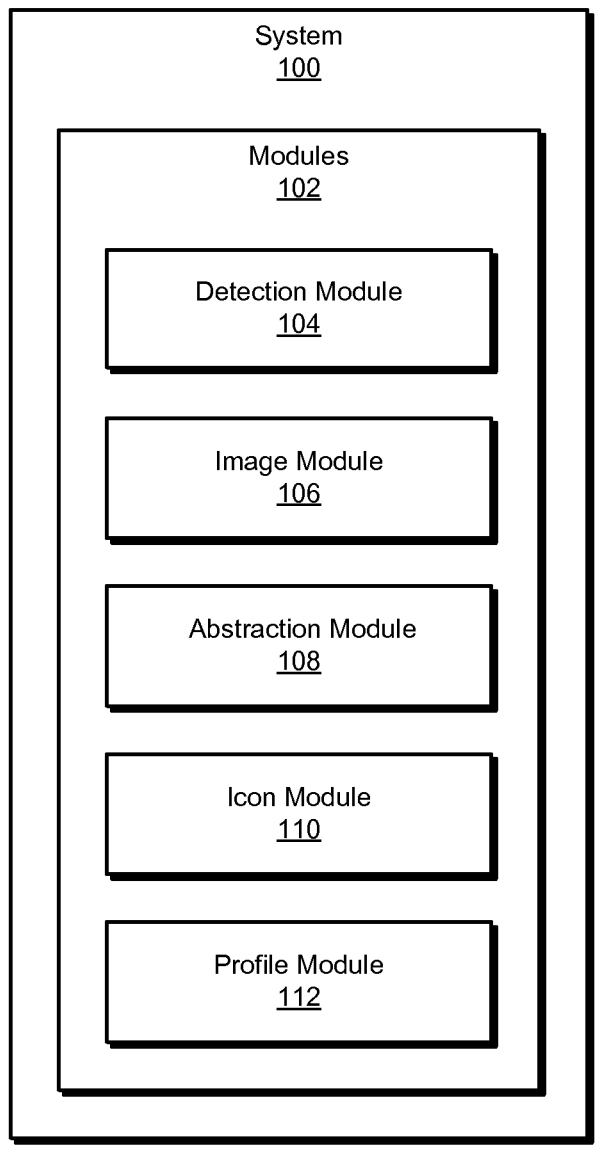
FIG. 1 is a block diagram of an exemplary system for customizing user icons.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for customizing user icons. As will be explained in greater detail below, by creating and incorporating customized user icons into applications, the systems and methods described herein may personalize and enhance a user's experience with the application. Specifically, the disclosed systems and methods may improve the user's experience by automatically replacing and/or overlaying existing in-product icons (e.g., generic icons) within applications with customized representations of users. In addition, rather than requesting that a user manually customize their user profile within an application, the disclosed systems and methods may save the user time and effort by automatically providing a personalized icon.

Figure 2:
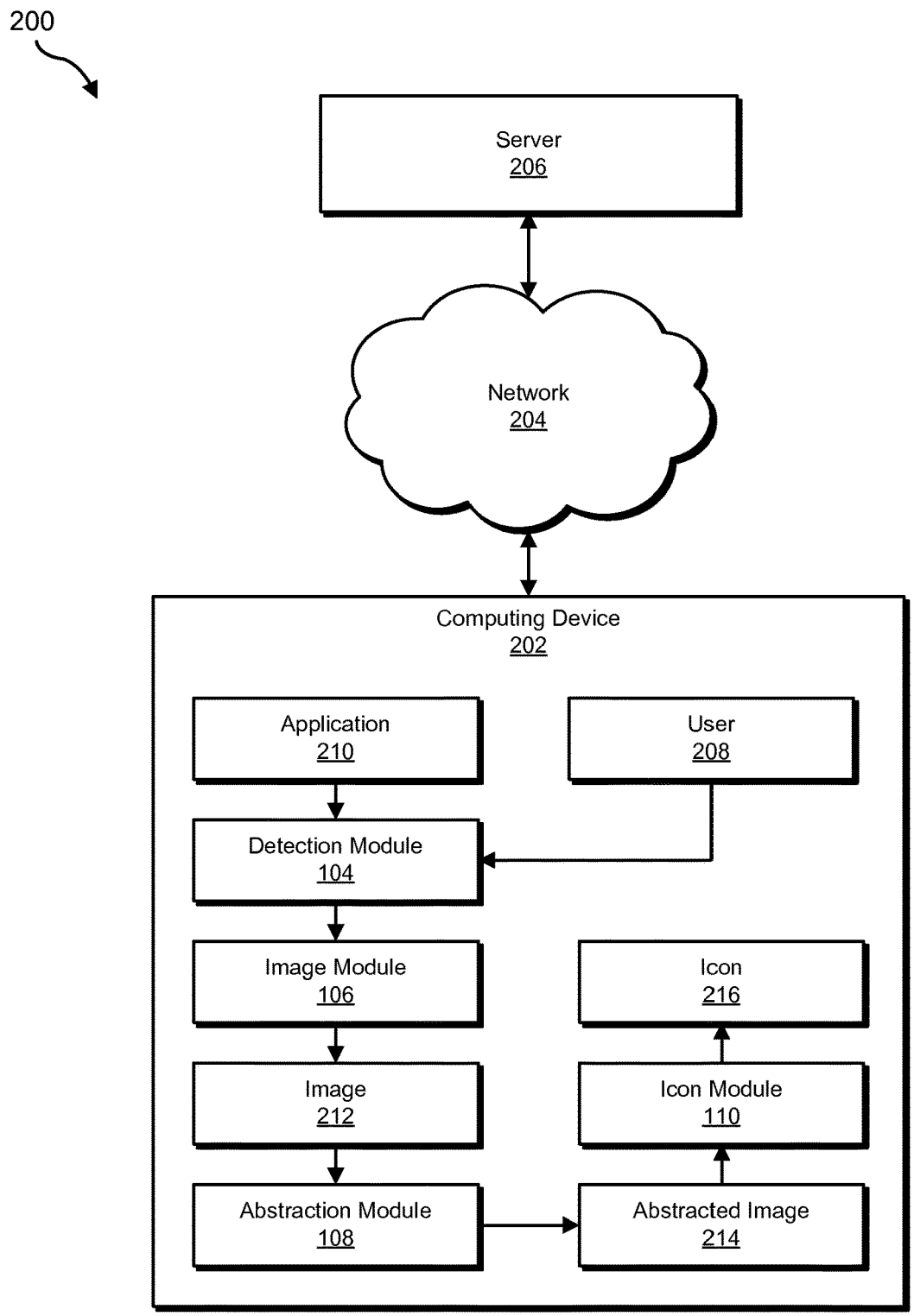
FIG. 2 is a block diagram of an additional exemplary system for customizing user icons.

The following will provide, with reference to FIGS. 1-2, detailed descriptions of exemplary systems for customizing user icons. Detailed descriptions of corresponding computer-implemented methods will also be provided in connection with FIG. 3. Detailed descriptions of exemplary images and icon customizations are presented in connection with FIGS. 4-7. In addition, detailed descriptions of an exemplary computing system and network architecture capable of implementing one or more of the embodiments described herein will be provided in connection with FIGS. 8 and 9, respectively.

FIG. 1 is a block diagram of an exemplary system 100 for customizing user icons. As illustrated in this figure, exemplary system 100 may include one or more modules 102 for performing one or more tasks. For example, and as will be explained in greater detail below, exemplary system 100 may include a detection module 104 that detects that a user has accessed an application. Exemplary system 100 may also include an image module 106 that automatically captures an image of the user in response to detecting that the user has accessed the application.

In addition, and as will be described in greater detail below, exemplary system 100 may include an abstraction module 108 that abstracts the image of the user to produce a customized representation of the user. Exemplary system 100 may also include an icon module 110 that overlays the abstracted image of the user onto an icon within the application. Furthermore, exemplary system 100 may include a profile module 112 that determines that the user has entered at least one item of information that identifies a physical characteristic of the user into a user profile associated with the application. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 810 in FIG. 8, and/or portions of exemplary network architecture 900 in FIG. 9. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102. Additionally or alternatively, server 206 may be programmed with one or more of modules 102.

In some examples, both computing device 202 and server 206 may be capable of individually hosting and executing all of modules 102. However, in other embodiments, the functionality of modules 102 may be divided among computing device 202 and server 206 in order to more efficiently utilize their available computing resources. For example, server 206 may be programmed with abstraction module 108, as the abstraction process may be the most resource-intensive step, while computing device 202 may be programmed with the remaining modules, which may perform functions that involve direct interaction with an application and/or camera device hosted on a computing system.

In one embodiment, one or more of modules 102 from FIG. 1 may, when executed by at least one processor of computing device 202 and/or server 206, enable computing device 202 and/or server 206 to customize user icons. For example, and as will be described in greater detail below, detection module 104 may cause computing device 202 to detect that a user (e.g., user 208) has accessed an application (e.g., application 210). Image module 106 may then cause computing device 202 to automatically capture an image (e.g., image 212) of the user in response to detecting that the user has accessed the application. In addition, abstraction module 108 may cause computing device 202 to abstract the image of the user to produce a customized representation (e.g., abstracted image 214) of the user. Furthermore, icon module 110 may cause computing device 202 to overlay the abstracted image of the user onto an icon (e.g., icon 216) within the application.

The term "application," as used herein, generally refers to any type or form of executable code with which a user may interact. In some examples, an application may contain one or more user profiles that allow a user to store personal information and customize settings within the application. In some applications, the user profiles may be represented by a generic icon or other standard depiction of the user. Examples of applications include, without limitation, Graphical User Interfaces (GUIs) for operating systems, security software, gaming software, social networking clients, and/or any suitable type or form of software program.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 810 in FIG. 8, or any other suitable computing device.

Server 206 generally represents any type or form of computing device that is capable of analyzing, storing, and abstracting images. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 900 in FIG. 9, or the like. Network 204 may facilitate communication or data transfer using wireless or wired connections. In one embodiment, network 204 may facilitate communication between computing device 202 and server 206.

Figure 3:
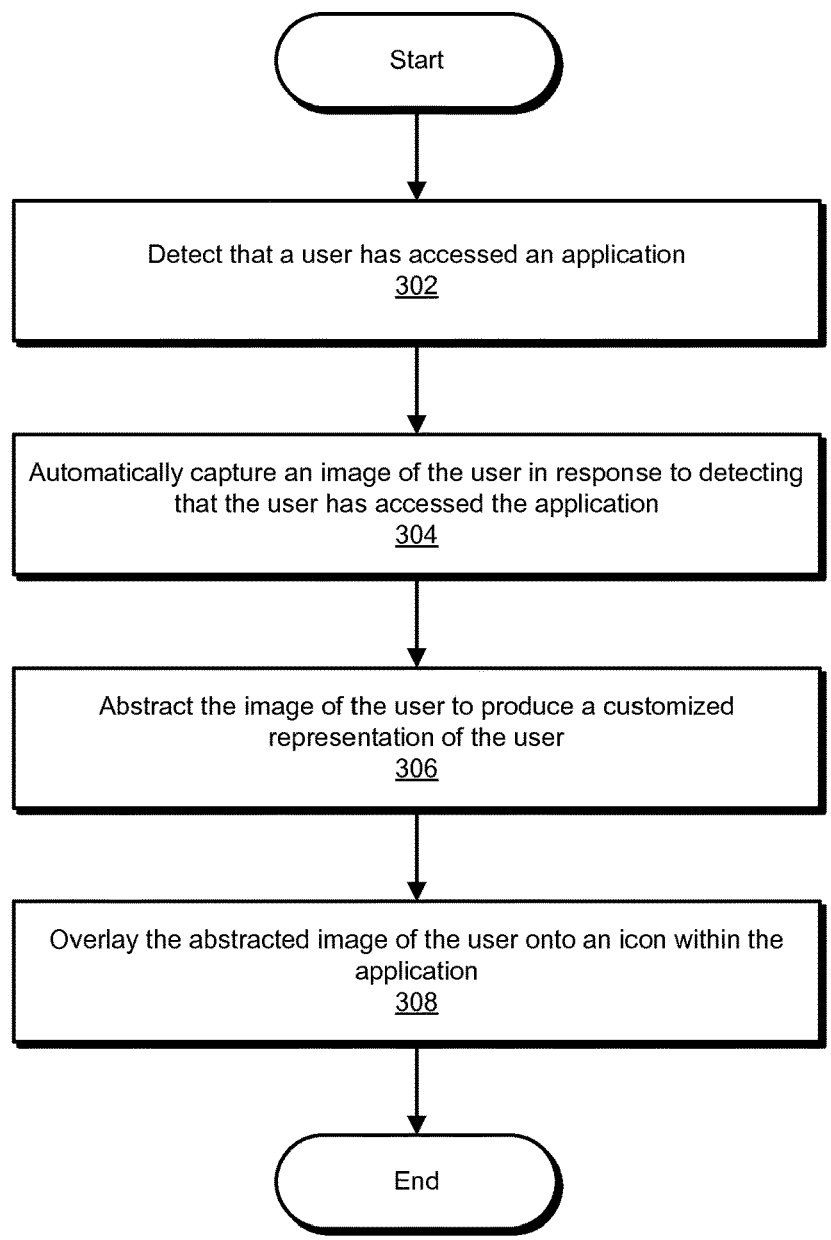
FIG. 3 is a flow diagram of an exemplary method for customizing user icons.

FIG. 3 is a flow diagram of an exemplary computer-implemented method 300 for customizing user icons. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 810 in FIG. 8, and/or portions of exemplary network architecture 900 in FIG. 9.

As illustrated in FIG. 3, at step 302 one or more of the systems described herein may detect that a user has accessed an application. For example, detection module 104 may, as part of computing device 202 in FIG. 2, detect that user 208 has accessed application 210.

The systems described herein may detect that a user has accessed an application in a variety of ways. In some examples, application 210 may require that user 208 provide login credentials in order to access application 210. In these examples, detection module 104 may detect that user 208 has accessed application 210 when user 208 provides the correct login credentials. Additionally or alternatively, detection module 104 may detect that user 208 has accessed application 210 by detecting that user 208 has opened application 210 (e.g., has clicked on a shortcut for application 210, has launched an executable file for application 210, etc.) or has otherwise accessed application 210.

In addition to detecting that user 208 has accessed application 210, detection module 104 may determine the context in which user 208 has accessed and/or utilized application 210. For example, in some embodiments detection module 104 may detect that user 208 has accessed application 210 for the first time. Additionally or alternatively, detection module 104 may detect that user 208 has performed a particular task within or with respect to application 210, such as changing default settings, creating a user profile, and/or customizing an avatar within application 210. As will be explained in greater detail below, detection module 104 may determine whether an icon associated with user 208 should be created based on the context in which user 208 has accessed application 210.

Returning to FIG. 3, at step 304 one or more of the systems described herein may automatically capture an image of the user in response to detecting that the user has accessed the application. For example, image module 106 may, as part of computing device 202 in FIG. 2, automatically capture image 212 in response to detection module 104 detecting that user 208 has accessed application 210.

The phrase "image of the user," as used herein, generally refers to any visual representation of a user, such as a picture or a symbol. For example, an image of a user may be a digital photograph or avatar of the user. In other examples, an image of a user may be an object, pattern, or symbol that the user has chosen to represent himself or herself. An image of the user may be stored and analyzed in any of a variety of digital image formats, such as .JPEG, .PNG, .BMP, or .GIF.

In addition, the term "automatically," as used herein, generally refers to a process performed by a computing system without user direction, interaction, and/or input. For example, the systems and methods described herein may automatically capture user images and may automatically customize icons by performing these processes without a user's prompting or interaction.

In some examples, image module 106 may automatically capture image 212 by triggering a camera device installed on a computing system, such as computing device 202, to capture image 212. In these examples, image module 106 may access the camera device and direct the camera device to automatically capture image 212 once the camera device has detected and focused on the face of user 208. In this example, no input from the user may be needed at any point during the image capturing process.

In other examples, image module 106 may automatically prompt the user to capture and/or provide image 212 in order to provide opportunities for user input and/or customization during the image capturing process. In one embodiment, image module 106 may automatically prompt user 208 to direct a camera on computing device 202 to capture image 212. For example, after detection module 104 detects that user 208 has accessed application 210, image module 106 may automatically prompt user 208 to choose to continue with or cancel the image capturing process. Alternatively, or in response to user 208 choosing to continue the image capturing process, image module 106 may open a camera application and direct user 208 to manually capture image 212. In addition, image module 106 may automatically prompt user 208 to provide image 212 from a pre-existing image stored on computing device 202 or otherwise accessible to user 208.

Some applications, such as social networking applications, may contain existing functionalities that allow users to customize user icons. Embodiments of the systems described herein may be implemented on applications that contain such built-in icon customization functionalities, as well as applications that do not. In some examples, image module 106 may determine whether application 210 contains a built-in icon customization function before automatically capturing image 212 in order to tailor the image capturing process to application 210.

For example, if image module 106 determines that application 210 does contain a built-in function to customize user icons, image module 106 may allow user 208 to override and/or bypass the manual customization process and proceed with the automatic image capturing and abstracting processes described herein. However, if image module 106 determines that application 210 does not contain a built-in customization function, image module 106 may direct icon module 110 to create an icon and/or modify an existing generic icon, as will be described in greater detail below. In this way, the disclosed systems and methods may provide a user with an efficient and unique icon customization process that may be implemented in any application.

As previously mentioned, detection module 104 may determine whether an icon associated with user 208 should be created based on the context in which user 208 accesses and/or interacts with application 210. In some examples, image module 106 may determine whether an image of user 208 has previously been captured before capturing image 212. In other words, image module 106 may only capture an image of user 208 after the first time detection module 104 detects that user 208 has accessed application 210, as additional images may be unnecessary. In other examples, image module may capture an image of user 208 after each time user 208 accesses application 210, after user 208 has accessed application 210 a predetermined number of times, or when user 208 accesses application 210 after a predetermined amount of time. In such examples, image module 106 may continue to update image 212 so that image 212 is an accurate physical representation of user 208 and/or to provide user 208 with fresh, new automatically-customized icons.

In some embodiments, image module 106 may wait to capture image 212 until after detection module 104 detects that user 208 has performed a particular task (e.g., changing default settings within application 210, creating and/or updating a user profile within application 210, etc.). In this way, the systems described herein may avoid using computing resources and/or interrupting the execution of application 210 until after user 208 has indicated an interest in customizing application 210 and/or a user profile within application 210.

Returning to FIG. 3, at step 306 one or more of the systems described herein may abstract the image of the user to produce a customized representation of the user. For example, abstraction module 108 may, as part of computing device 202 in FIG. 2, abstract image 212 to produce abstracted image 214.

Figure 4:
FIG. 4 is a diagram of an exemplary image of a user.

The systems described herein may abstract the image of the user in a variety of ways. In some examples, abstraction module 108 may first analyze image 212 to identify physical characteristics of the user. As an example, FIG. 4 shows image 212 of user 208. Abstraction module 108 may analyze image 212 to identify any number of physical characteristics of user 208 and/or traits that indicate a physical characteristic of user 208, such as gender, race, age range, hairstyle, facial hair pattern, facial feature structure, or any other suitable characteristic. Abstraction module 108 may use any of a variety of facial recognition algorithms or analyses to extract physical characteristics from image 212. In some examples, abstraction module 108 may identify a physical characteristic of user 208 from each of a predetermined set of categories.

Figure 5:
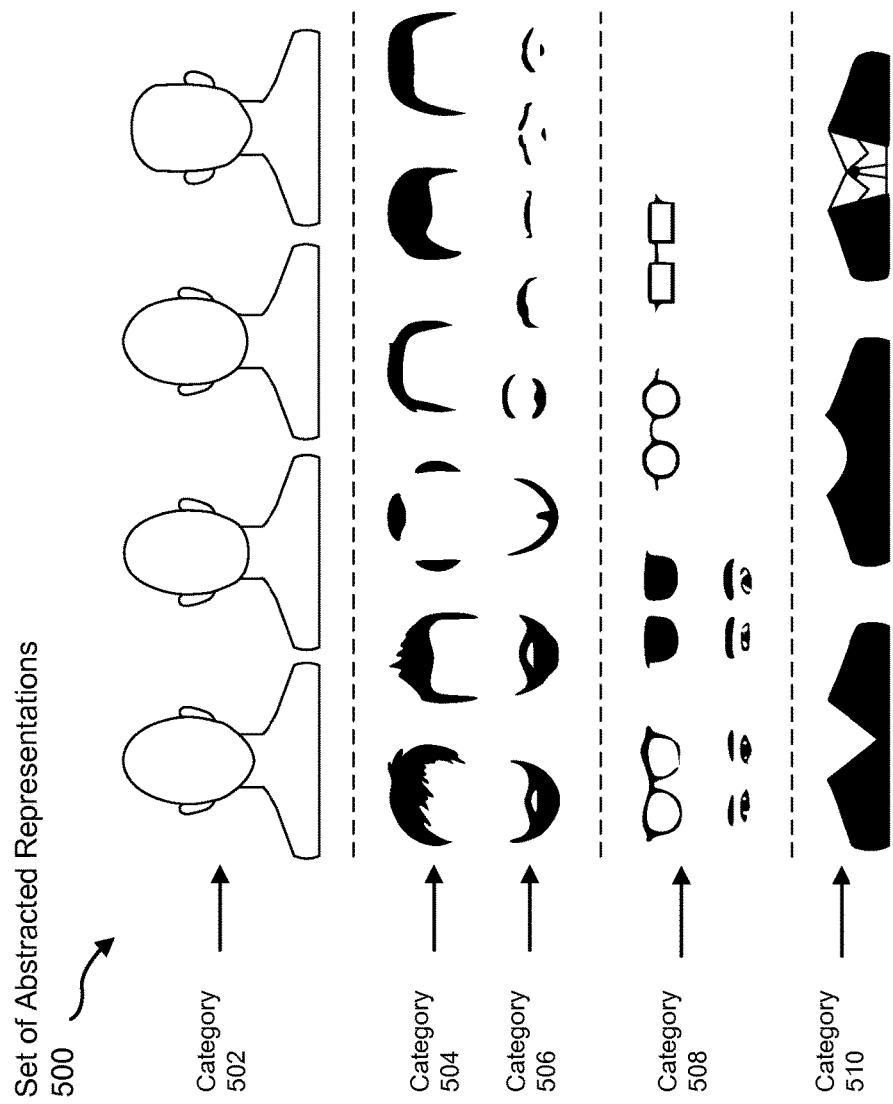
FIG. 5 is a diagram of an exemplary set of abstracted representations of physical characteristics.

As part of the image abstraction process, abstraction module 108 may map each identified physical characteristic to an abstracted representation of the physical characteristic from within a predetermined set of abstracted representations. FIG. 5 provides examples of predetermined abstracted representations. As shown in FIG. 5, set of abstracted representations 500 may include several different choices under each of categories 502, 504, 506, 508, and 510 (i.e., face shape, hairstyle, facial hair pattern, eyes/glasses type, and shirt type). In general, the set of abstracted representations may include fewer or additional categories and choices within the categories as well as represent different overall styles (e.g., realistic, cartoonish, colorful, black and white, etc.). In one example, mapping the identified physical characteristic to an abstracted representation may be as simple as choosing a male or female icon. In other examples, mapping the identified physical characteristics to abstracted representations may involve a large number of physical characteristics to produce an accurate, detailed representation of the user.

Figure 6:
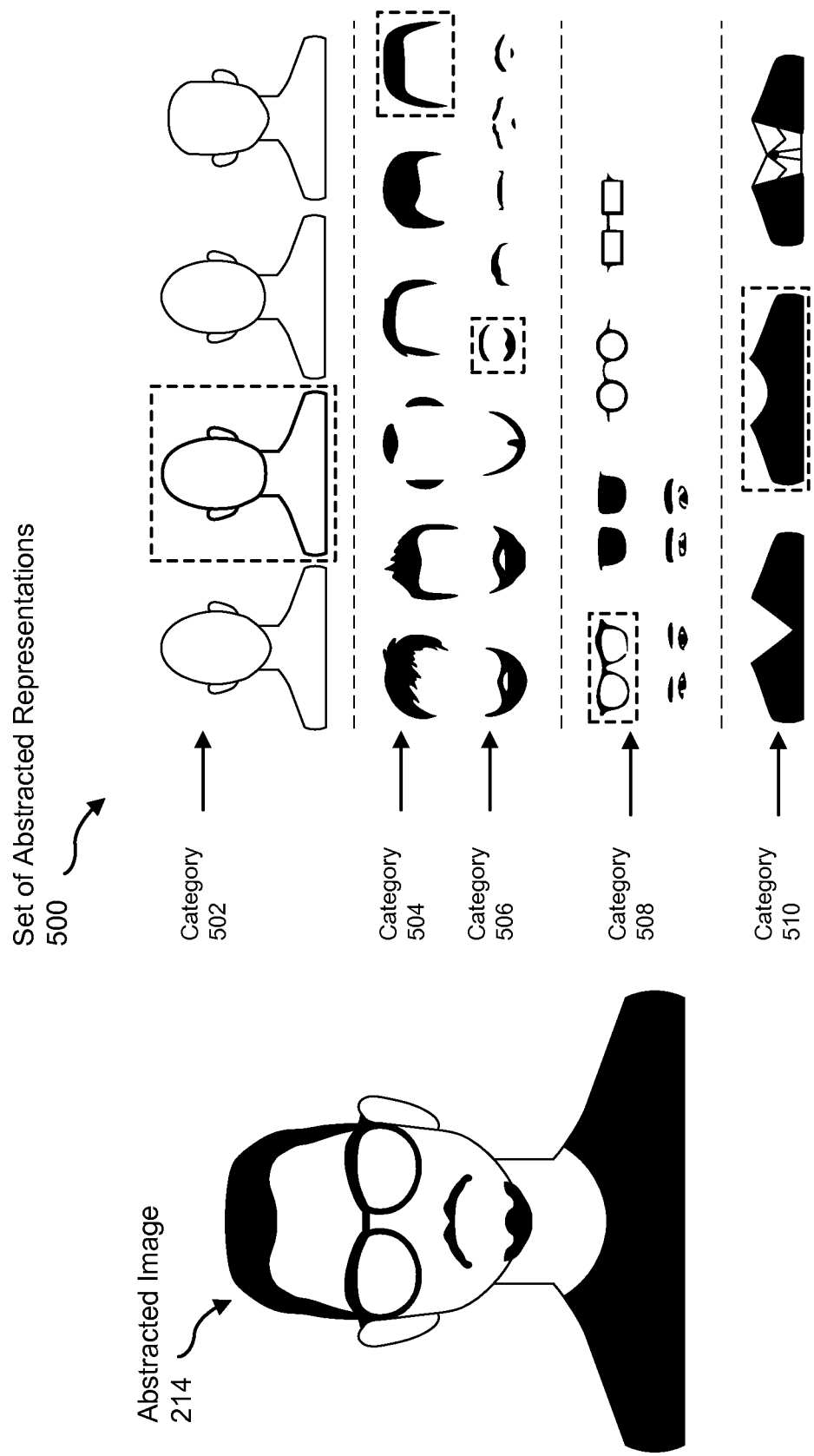
FIG. 6 is a diagram of an exemplary image abstraction process.

FIG. 6 provides an example of mapping physical characteristics to abstracted representations. Using image 212 displayed in FIG. 4, abstraction module 108 may select the representation (shown in FIG. 6 with dashed boxes) from each of categories 502, 504, 506, 508, and 510 shown in FIG. 5 that most closely matches the physical characteristics identified from image 212. Abstraction module 108 may select the abstracted representation that most closely matches each physical characteristic in a variety of ways, such as by computing the Euclidean distance between the isolated physical characteristic and each abstracted representation.

Once abstraction module 108 has mapped each physical characteristic to an abstracted representation, abstraction module 108 may compile the abstracted representations to create abstracted image 214. As an example, FIG. 6 shows abstracted image 214 created from image 212 in FIG. 4. In this example, abstracted image 214 represents the compilation of each abstracted representation selected as most closely matching the identified physical characteristics of image 212.

In addition to or instead of mapping physical characteristics of image 212 to abstracted representations, abstraction module 108 may abstract image 212 in any other suitable way, such as by performing an abstraction process directly on image 212. For example, abstraction module 108 may create abstracted image 214 by pixelating image 212, highlighting elements of image 212, filtering image 212, and/or otherwise transforming image 212.

Any of the previously described abstraction methods may be performed automatically in response to capturing an image of the user. Just as automatically capturing the image of the user may reduce the need for user input and/or interaction, automatically abstracting the image of the user after capturing the image may reduce the time and effort involved in producing a customized icon.

Furthermore, profile module 112 may create and/or augment abstracted image 214 by determining that user 208 has entered at least one item of information that identifies a physical characteristic of user 208 into a user profile associated with application 210. For example, many applications may offer a user the opportunity to customize an application by entering information (e.g., entering hair color or checking a box to indicate gender) that directly indicates a physical characteristic of the user. In addition, a user may enter information, such as date of birth or name, into a user profile that may indirectly indicate a physical characteristic. In such embodiments, profile module 112 may use information provided by a user to infer physical characteristics of the user. For example, profile module 112 may use the date of birth of user 208 to determine the age of user 208. In addition, profile module 112 may determine the gender of user 208 by determining that user 208 has indicated their name as a name that is typically associated with a specific gender. Profile module 112 may identify and analyze the user profile of user 208 to extract any relevant information that abstraction module 108 may then map to an appropriate abstracted representation from within the predetermined set of abstracted representations.

As an example, abstraction module 108 may not account for the eye color of user 208 when compiling abstracted image 214. However, user 208 may have indicated their eye color in a user profile within application 210. Profile module 112 may extract and use this information to update abstracted image 214 (i.e., by changing the eye color shown in abstracted image 214) so that abstracted image 214 may more accurately represent the physical appearance of user 208. In another example, user 208 may be unable to provide or may choose not to provide an image to image module 106. However, user 208 may have entered her name as "Julie" into a user profile. Profile module 112 may determine that the gender of user 208 is female based on user 208 having entered a name that is typically a female name. Profile module 112 may then use this determination to select a "female" icon for user 208.

In some embodiments, profile module 112 may analyze an image and/or other profile information to identify a base icon (e.g., a generic male or female icon) that can be further modified to reflect a particular user. For example, upon inferring that user 208 is male (e.g., based on a name, abstracted physical characteristics, etc.), profile module 112 select a generic male icon and may modify aspects (e.g., eye color, hair color, facial features) of the icon with abstracted representations of characteristics that more closely reflect the features of user 208.

Returning to FIG. 3, at step 308 one or more of the systems described herein may overlay the abstracted image of the user onto an icon within the application. For example, icon module 110 may overlay abstracted image 214 onto icon 216.

As used herein, the phrase "icon" generally refers to any symbol, image, or other visual representation within an application. Icons may be used to indicate a status and/or represent a user of an application. Specifically, icons may be associated with user profiles within applications and may customized to serve as representations of the physical appearance of a user.

The systems described herein may overlay the abstracted image onto an icon in a variety of ways. In some examples, icon 216 may be an existing icon within application 210 and/or a user profile of user 208. In these examples, icon module 110 may identify icon 216 and overlay abstracted image 214 onto icon 216. Specifically, icon module 110 may first map abstracted image 214 onto an icon overlay. The phrase "icon overlay," as used herein, generally refers to any type or form computerized image capable of replacing and/or covering an existing image. In particular, an icon overlay may be used to replace, cover, or modify a generic icon within an application. Once icon module 110 has mapped abstracted image 214 onto an icon overlay, icon module 110 cover the existing icon with the icon overlay. Additionally or alternatively, icon module 110 may map abstracted image 214 directly onto an existing icon.

In other examples, application 210 may not contain an existing icon. In these examples, icon module 110 may create and insert icon 216 into application 210. Icon module 110 may then map abstracted image 214 onto and icon overlay and then overlay the icon overlay onto icon 216. In order to overlay abstracted image 214 onto icon 216, icon module 110 may automatically assume and/or obtain access to permissions requested by application 210.

As mentioned previously, abstraction module 108 may incorporate information that user 208 has entered into a user profile into abstracted image 214. In some examples, abstraction module 108 may continue to update abstracted image 214 and/or icon 216 over time as user 208 updates their user profile with additional information that identifies or is associated with physical characteristics of user 208. Additionally or alternatively, the systems described herein may update abstracted image 214 and/or icon 216 with additional images of user 208, as discussed above.

Figure 7:
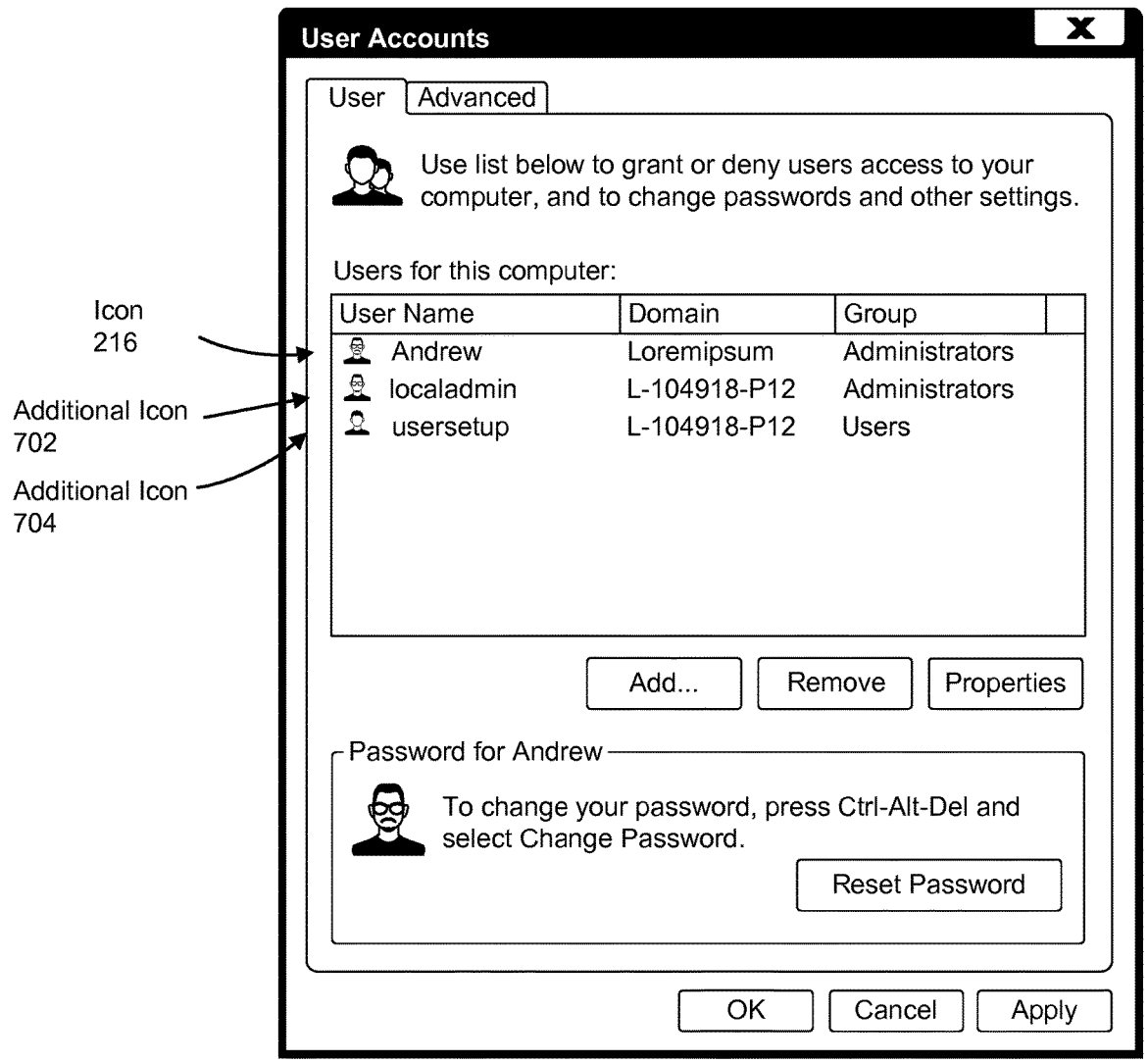
FIG. 7 is a diagram of exemplary customized user icons.

In some embodiments, after detection module 104 has detected that user 208 has accessed application 210, detection module 104 may detect that an additional user has accessed application 210. In response to detecting that an additional user has accessed application 210, the systems described herein may repeat the icon creation process previously described. Specifically, image module 106 may automatically capture an image of the additional user, abstraction module 108 may abstract the image of the additional user, and icon module 110 may then overlay the abstracted image of the additional user onto an additional icon within application 210. FIG. 7 shows an example of multiple user icons overlayed into an application. For example, the "User Accounts" window displayed in FIG. 7 shows three users, "Andrew," "localadmin," and "usersetup," which belong to different domains and/or groups. Accordingly, each user is represented by a distinct, customized icon (i.e., icon 216 representing "Andrew," additional icon 702 representing "localadmin," and additional icon 704 representing "usersetup").

In some examples, detection module 104 may detect that the additional user has accessed application 210 by determining that the additional user has logged onto application 210 with different login credentials than user 208. For example, detection module 104 may identify and store login credentials of a user when the user logs onto application 210. Detection module 104 may then compare the login credentials of the additional user with the login credentials of user 208 and determine that the additional user has logged onto application 210 based on the comparison. Additionally or alternatively, detection module 104 may detect that the additional user has accessed application 210 by determining that facial characteristics of the additional user do not match facial characteristics of user 208. To do so, detection module 104 may direct image module 106 to automatically capture the image of the additional user and compare the image of the additional user with image 212 using any of a variety of facial recognition algorithms or analyses. As such, icon module 110 may enable multiple users of an application to automatically personalize and distinguish their individual accounts within the application.

The systems and methods disclosed herein may be implemented in a variety of ways and provide a number of advantages. For example, by automatically capturing an image of a user after the user accesses an application, the systems and methods described herein may provide a customized icon to the user without requiring additional input from the user. In addition, by replacing standard, generic icons with personalized representations of a user, the disclosed systems and method may distinguish and enhance user profiles within applications.

Figure 8:
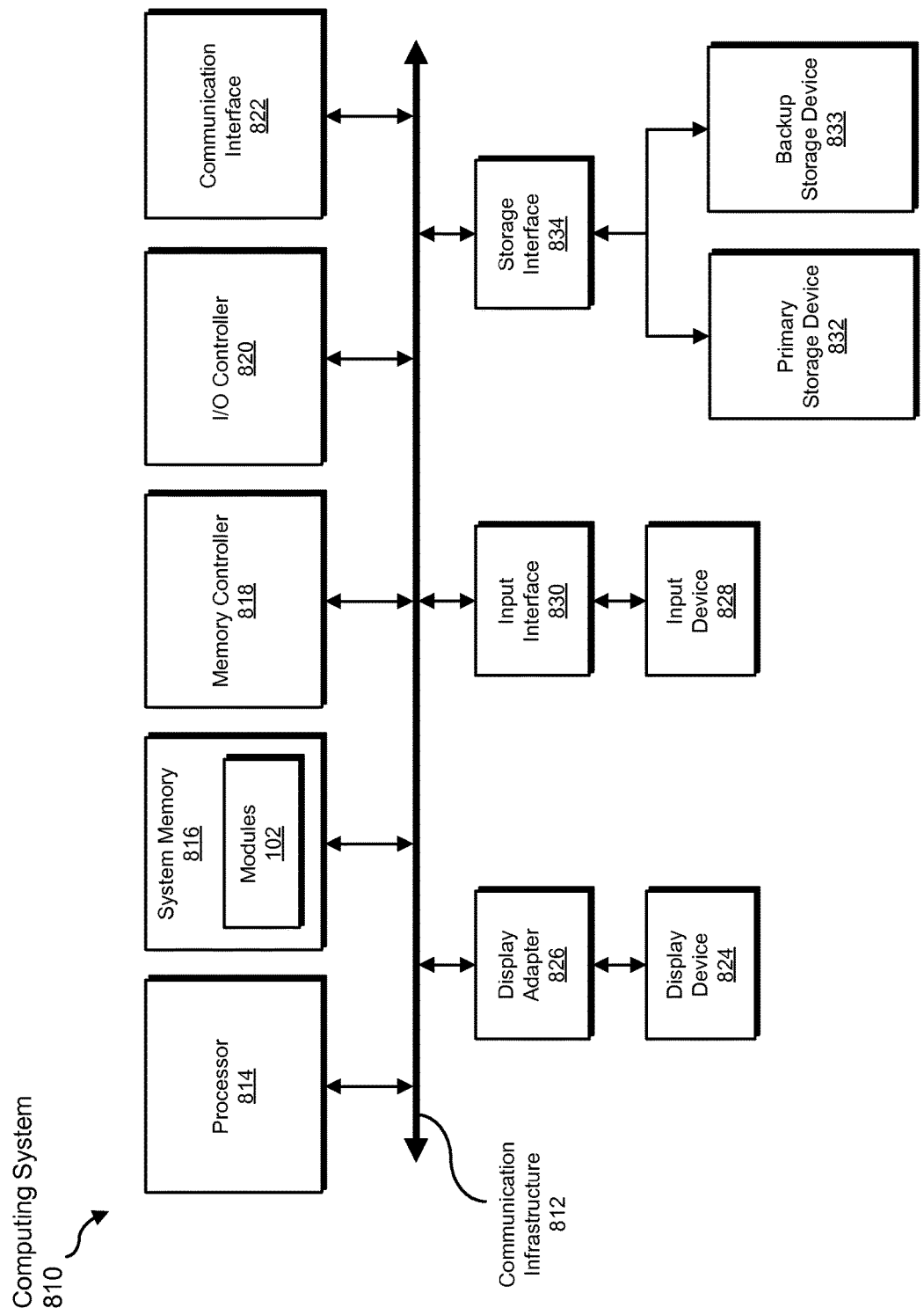
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the exemplary embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an Application Specific Integrated Circuit (ASIC) adapted to implement one or more of the exemplary embodiments disclosed herein.

Figure 9:
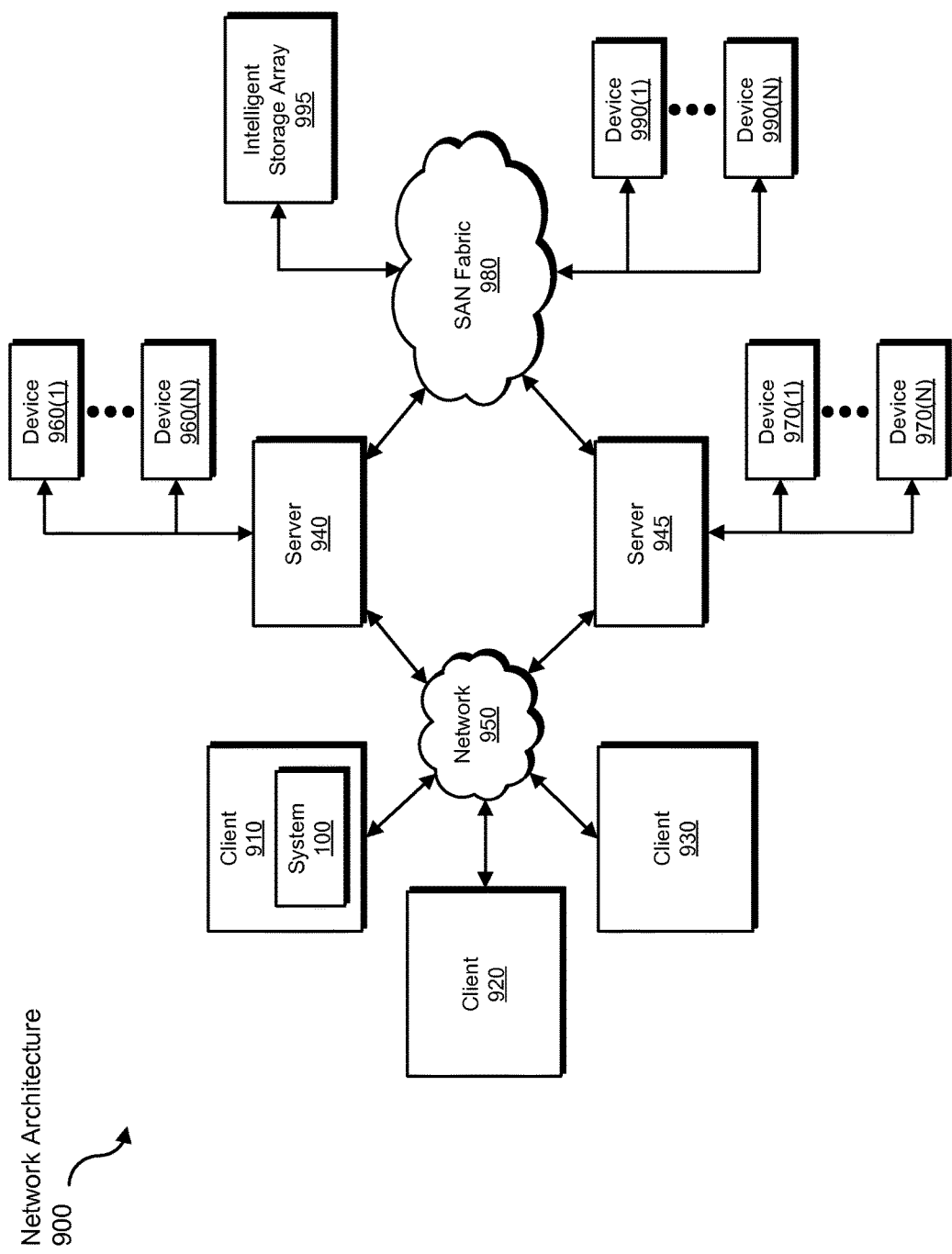
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an exemplary method for customizing user icons.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may capture an image, transform the image by abstracting the image, and overlay the transformed image onto an icon within an application. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for customizing user icons, at least a portion of the method being performed by a computing device comprising at least one processor, the method comprising:
    monitoring, by a program that operates outside of the control of a computer application, the computer application to detect each time a user accesses the computer application; and
    after each time the user accesses the computer application, generating, by the program, a customized icon representative of the user by:
        automatically capturing an image of the user;
        identifying a plurality of physical characteristics of the user by analyzing the image of the user, the physical characteristics comprising one or more facial features of the user;
        inferring a gender of the user based on the identified physical characteristics of the user;
        selecting, from a plurality of base icons that represent various physical characteristics of users, a base icon corresponding to the inferred gender of the user;
        producing a customized representation of the user from the base icon by modifying, based on the facial features of the user, at least one aspect of the base icon such that the customized representation of the user more accurately represents a current physical state of the user than a previously-generated customized representation of the user;
        identifying, within the computer application, a generic icon that:
            is provided by the computer application; and
            displays a generic image representative of the user;
        updating the generic icon by replacing the generic image with the customized representation of the user; and
        displaying, within the computer application, the updated generic icon.

2. The method of claim 1, wherein monitoring the computer application to detect each time the user accesses the computer application comprises detecting each time the user logs into an account managed by the computer application by providing login credentials associated with the account.

3. The method of claim 1, wherein automatically capturing the image of the user comprises at least one of:
    automatically triggering a camera on the computing device hosting the computer application to capture the image of the user; and
    automatically prompting the user to direct the camera to capture the image of the user.

4. The method of claim 1, wherein identifying the plurality of physical characteristics of the user comprises identifying at least one of:
    a race of the user;
    an age range of the user;
    facial feature structures of the user;
    a hairstyle of the user;
    a facial hair pattern of the user; and
    accessories worn by the user.

5. The method of claim 1, further comprising, upon identifying the physical characteristics of the user:
    mapping each physical characteristic to an abstracted representation of the physical characteristic from within a predetermined set of abstracted representations; and
    compiling the abstracted representations into the customized representation of the user.

6. The method of claim 1, further comprising:
    detecting that an additional user has accessed the computer application; and
    in response to detecting that the additional user has accessed the computer application:
        automatically capturing an image of the additional user;
        producing a customized representation of the additional user; and
        displaying the customized representation of the additional user on an additional icon within the computer application.

7. The method of claim 6, wherein detecting that the additional user has accessed the computer application comprises at least one of:
    determining that the additional user has logged onto the computer application with different login credentials than the user; and
    determining, by analyzing the image of the additional user, that facial features of the additional user do not match the facial features of the user.

8. The method of claim 1, further comprising:
    determining that the user has entered, into a user profile associated with the computer application, at least one item of information that identifies a physical characteristic of the user;
    mapping the information that identifies the physical characteristic of the user to an abstracted representation of the physical characteristic from within a predetermined set of abstracted representations; and incorporating the abstracted representation into the customized representation of the user.

9. The method of claim 8, wherein:
determining that the user has entered, into the user profile associated with the computer application, the item of information that identifies the physical characteristic of the user comprises determining that the user has entered a birthdate that indicates an age of the user; and
mapping the information that identifies the physical characteristic of the user to the abstracted representation of the physical characteristic comprises selecting an abstracted representation of at least one physical characteristic associated with the age of the user from within the predetermined set of abstracted representations.

10. A system for customizing user icons, the system comprising:
a hardware processor;
a detection module, executed by the hardware processor as part of a program that operates outside of the control of a computer application, that monitors the computer application to detect each time a user accesses the computer application;
an image module, executed by the hardware processor as part of the program, that automatically captures an image of the user after each time the user accesses the computer application;
an abstraction module, executed by the hardware processor as part of the program, that generates a customized icon representative of the user by:
identifying a plurality of physical characteristics of the user by analyzing the image of the user, the physical characteristics comprising one or more facial features of the user;
inferring a gender of the user based on the identified physical characteristics of the user;
selecting, from a plurality of base icons that represent various physical characteristics of users, a base icon corresponding to the inferred gender of the user; and
producing, a customized representation of the user from the base icon by modifying, based on the facial features of the user, at least one aspect of the base icon such that the customized representation of the user more accurately represents a current physical state of the user than a previously-generated customized representation of the user; and
an icon module, executed by the hardware processor as part of the program, that:
identifies, within the computer application, a generic icon that:
is provided by the computer application; and
displays a generic image representative of the user;
updates the generic icon by replacing the generic image with the customized representation of the user; and
displays, within the computer application, the updated generic icon.

11. The system of claim 10, wherein the detection module detects each time the user accesses the computer application by detecting each time the user logs into an account managed by the computer application by providing login credentials associated with the account.

12. The system of claim 10, wherein the image module automatically captures the image of the user by at least one of:
automatically triggering a camera on a computing system hosting the computer application to capture the image of the user; and
automatically prompting the user to direct the camera to capture the image of the user.

13. The system of claim 10, wherein the abstraction module identifies the plurality of physical characteristics of the user by identifying at least one of:
a race of the user;
an age range of the user;
facial feature structures of the user;
a hairstyle of the user;
a facial hair pattern of the user; and
accessories worn by the user.

14. The system of claim 10, further comprising, upon identifying the physical characteristics of the user, the abstraction module:
maps each physical characteristic to an abstracted representation of the physical characteristic from within a predetermined set of abstracted representations; and
compiles the abstracted representations into the customized representation of the user.

15. The system of claim 10, further comprising:
the detection module detects that an additional user has accessed the computer application; and
in response to detecting that the additional user has accessed the computer application:
the image module automatically captures an image of the additional user;
the abstraction module produces a customized representation of the additional user; and
the icon module overlays the customized representation of the additional user onto an additional icon within the computer application.

16. The system of claim 15, wherein the detection module detects that the additional user has accessed the computer application by at least one of:
determining that the additional user has logged onto the computer application with different login credentials than the user; and
determining, by analyzing the image of the additional user, that facial features of the additional user do not match the facial features of the user.

17. The system of claim 10, further comprising:
a profile module, stored in memory, that determines that the user has entered, into a user profile associated with the computer application, at least one item of information that identifies a physical characteristic of the user;
the abstraction module maps the information that identifies the physical characteristic of the user to an abstracted representation of the physical characteristic from within a predetermined set of abstracted representations; and
the icon module incorporates the abstracted representation into the customized representation of the user.

18. A non-transitory computer-readable storage medium comprising one or more computer-executable instructions that, when executed by at least one processor of a computing device, cause the computing device to:
monitor, by a program that operates outside of the control of a computer application, the computer application to detect each time a user accesses the computer application; and
after each time the user accesses the computer application, generate, by the program, a customized icon representative of the user by:
automatically capturing an image of the user;

identifying a plurality of physical characteristics of the user by analyzing the image of the user, the physical characteristics comprising one or more facial features of the user;
inferring a gender of the user based on the identified physical characteristics of the user;
selecting, from a plurality of base icons that represent various physical characteristics of users, a base icon corresponding to the inferred gender of the user;
producing a customized representation of the user from the base icon by modifying, based on the facial features of the user, at least one aspect of the base icon such that the customized representation of the user more accurately represents a current physical state of the user than a previously-generated customized representation of the user;
identifying, within the computer application, a generic icon that:
 is provided by the computer application; and
 displays a generic image representative of the user;
updating the generic icon by replacing the generic image with the customized representative of the user; and
displaying, within the computer application, the updated generic icon.

19. The non-transitory computer-readable storage medium of claim 18, wherein the computer-executable instructions cause the computing device to automatically capture the image of the user by at least one of:
automatically triggering a camera on the computing device hosting the computer application to capture the image of the user; and
automatically prompting the user to direct the camera to capture the image of the user.

* * * * *